UNITED STATES PATENT OFFICE.

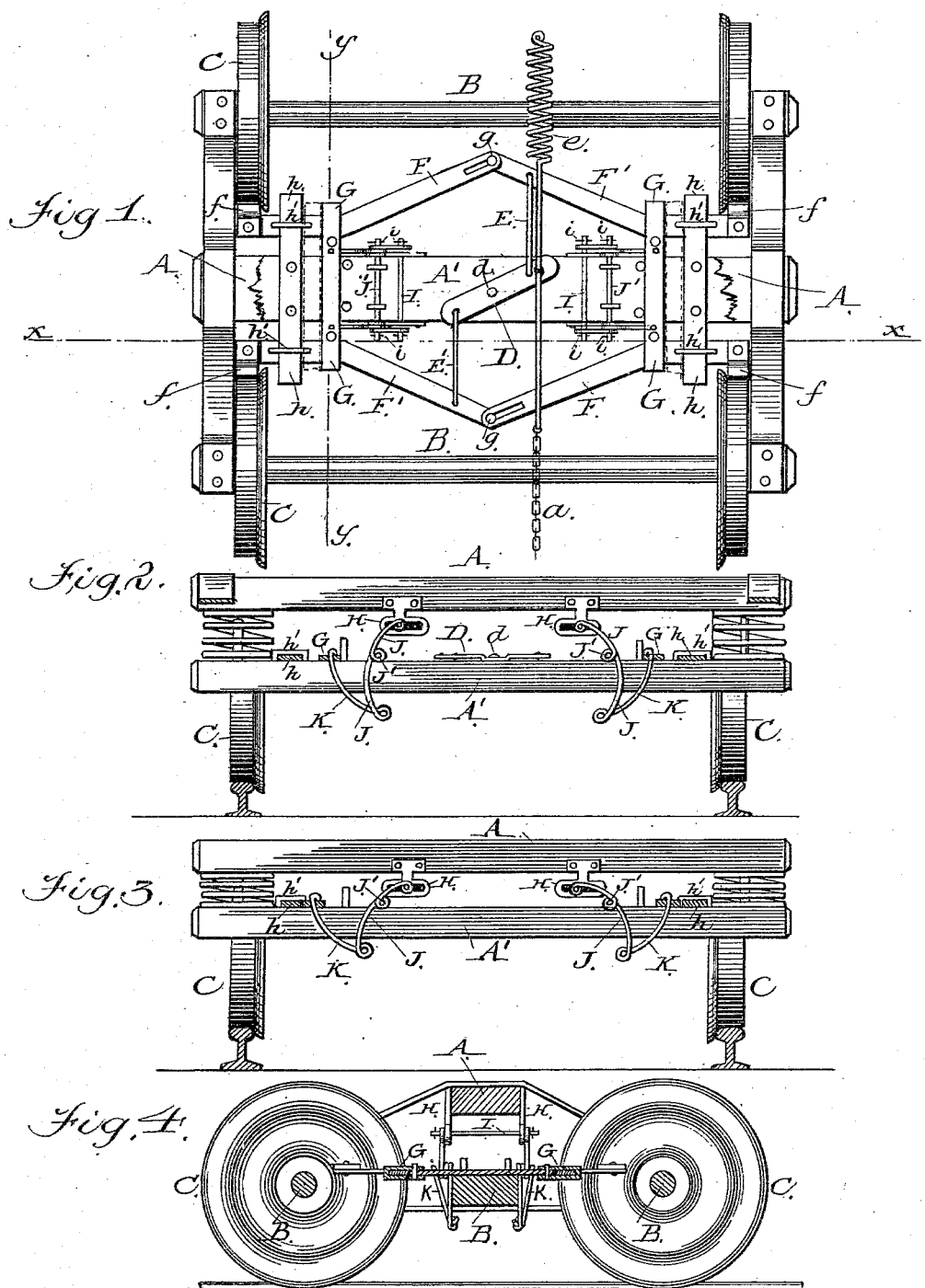

WILLIAM BRUMBLE, OF BALTIMORE, MARYLAND.

CAR-BRAKE.

SPECIFICATION forming part of Letters Patent No. 303,114, dated August 5, 1884.

Application filed May 1, 1884. (No model.)

*To all whom it may concern:*

Be it known that I, WILLIAM BRUMBLE, of the city of Baltimore, State of Maryland, have invented a new and useful Improvement in a Car-Brake Automatically Adjustable to the Load, of which the following is a full, clear, and exact description, reference being had to the accompanying drawings, forming part of this specification, in which—

Figure 1 is a plan view of a railway-truck (unloaded) with the top bolster partially broken away. Fig. 2 is a section on line $x\ x$ of Fig. 1. Fig. 3 is the same view of the truck of a loaded car. Fig. 4 is a section on the line $y\ y$ of Fig. 1.

The object of my present invention is to provide a brake which will automatically adjust its power to the weight of the load placed on the car, and is an improvement on Letters Patent No. 294,306, granted to me February 26, 1884, for an improvement in railway-car brakes.

To enable others skilled in the art to make and use my invention, I will proceed to describe the exact manner in which I have carried it out.

In the said drawings, A A' represent the upper and lower bolsters of a railway-truck; B, the axles, and C the wheels, secured in the usual manner. Secured to the ordinary brake lever or shaft is a chain, $a$, the opposite end being attached to the long arm of a lever, D, pivoted at $d$ to the lower bolster, A'. Spring $e$, one end of which is fastened to some suitable point beneath the car, is also connected to the long arm of the lever D, and serves to quickly release the rubber blocks $f$ from their contact with the wheels C when the power for controlling the brake is removed. Two links or connecting-bars, E E', one of which, E', is secured to the short arm $d'$ of the lever D, while the other is attached to the long arm of the lever, connect this lever D to the lever-plates F F', united at their inner ends by a bolt, $g$, working in a slot formed in the end of each pair of plates, thereby giving a free and easy movement to the rubber blocks $f$, secured to the outer ends of these plates, all of which construction is fully described and illustrated in my former patent. Extending across the lower bolster are sliding fulcrum-bars G, snugly embracing the short arms of the lever-plates F F, but sufficiently loose to allow the fulcrum-bars to slide freely on the short arms of the lever-plates, the outer ends of which pass through guides $h$, secured to the bolster, and which are prevented from lateral movement by the clamps $h'$, passing over the guides.

The object of the sliding fulcrum-bars G is to change the position of the fulcrum of the levers, and thus adjust the power of the levers to the weight which may be placed on the car, it being evident that the nearer the fulcrum of the lever approaches the outer end of the short arm the more powerful becomes the lever, and vice versa.

To render the adjustment of the power of the brake automatic is the essential object of my present invention. It is well known to all railroad men that any fixed power of a brake must act differently on empty and on loaded cars. A brake sufficient to stop the revolutions of an empty car will have but comparatively little effect on the same car when heavily loaded. My object, then, is to provide a brake which will automatically adjust its power to the weight of the load. To accomplish this I secure to each side of the top bolster the slotted arms H H, through which pass the bolts I, provided at each end with a key, $i$, for securing spring-levers J in position. These spring-levers are secured to the lower bolster by bolts J' or other suitable means, these bolts J' forming the fulcrum for the levers J, the short arms of which are secured by the keys $i$ to the outer ends of the bolts I, as shown in Fig. 1, while the lower or long arms are attached by the rods K to the fulcrum-bars G. It is evident from this construction that as the top bolster is depressed by the weight of the load the short arms of the spring-levers will be caused to move inward, while the lower or long arms will be forced outward, carrying with them the fulcrum-bars G, as shown in Figs. 2 and 3, thus automatically increasing the power of the brake in proportion to the weight of the load and the necessities of the case.

Having thus described my invention, what I claim as new, and desire to secure by Letters Patent, is—

1. In a railway-car brake, lever-fulcrums automatically adjusted by the weight of the load acting on adjusting-levers, substantially as and for the purpose set forth.

2. In a railway-car brake, automatically-adjustable fulcrum-bars G, in combination with spring-levers J and slotted arms H, substantially as and for the purpose set forth.

3. In a railway-car brake, the slotted arms H H, in combination with the levers J and sliding fulcrums automatically operated by the weight of the load, substantially as herein set forth.

4. In a railway-car brake, the bolster A, provided with the slotted arms H H, in combination with the spring-levers J, sliding fulcrum-bars G, and lever-plates F F', all constructed to operate substantially as and for the purpose described.

WILLIAM BRUMBLE.

Witnesses:
T. WALTER FOWLER,
H. B. APPLEWHAITE.